Feb. 10, 1925.
A. McL. NICOLSON
PIEZOELECTRICAL TRANSMITTER
Filed May 9, 1919
1,525,823
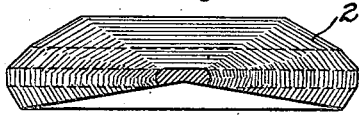
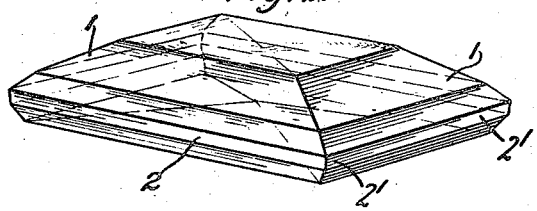
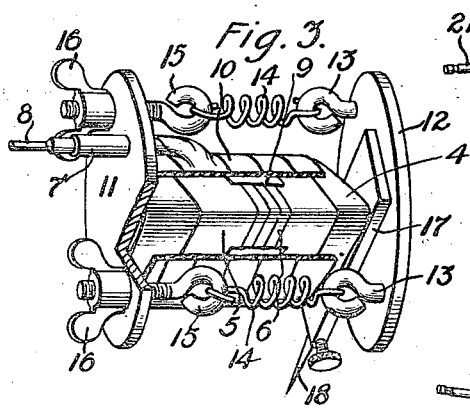
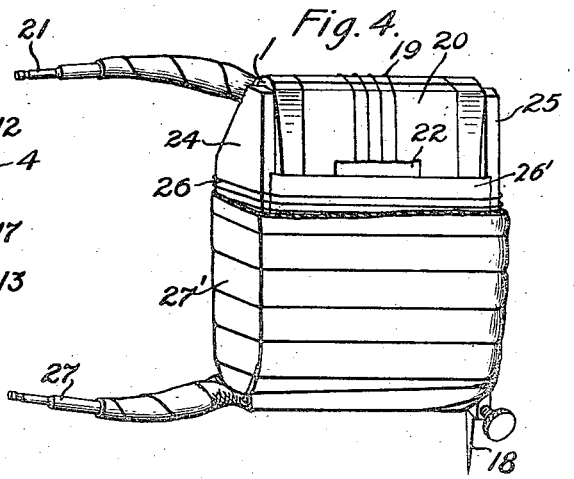
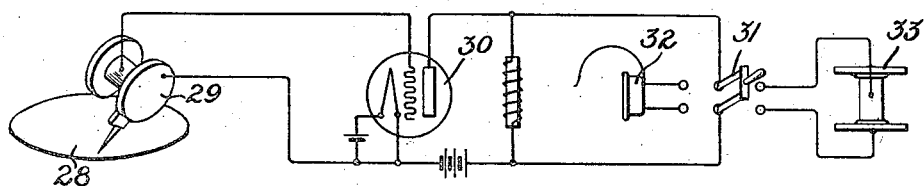
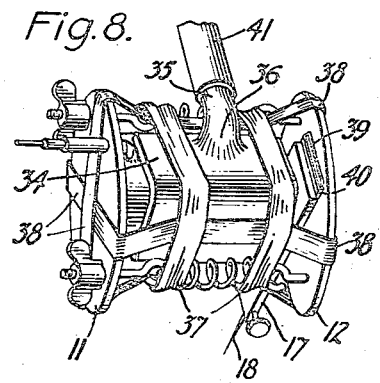
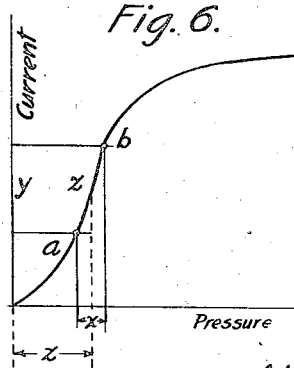
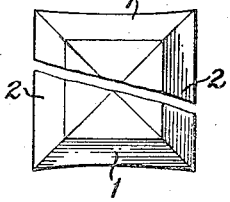
Inventor:
Alexander M. Nicolson.
by J. S. Roberts Att'y.

Patented Feb. 10, 1925.

1,525,823

UNITED STATES PATENT OFFICE.

ALEXANDER McL. NICOLSON, OF NEW YORK, N. Y., ASSIGNOR TO WESTERN ELECTRIC COMPANY, OF NEW YORK, N. Y., A CORPORATION OF NEW YORK.

PIEZOELECTRICAL TRANSMITTER.

Application filed May 9, 1919. Serial No. 295,967.

*To all whom it may concern:*

Be it known that I, ALEXANDER M. NICOLSON, a subject of Great Britain, residing at New York, in the county of New York, State of New York, have invented certain new and useful Improvements in Piezoelectrical Transmitters, of which the following is a full, clear, concise, and exact description.

As indicated in the handbook "Der Physik" volume 4, page 774, 1905, "Piezoelectricity" by F. Pockels, it was recognized as early as 1880 by J. and P. Curie that on subjecting the opposite sides of certain crystals to pressure a difference in electrical potential at certain sides of the crystal is produced. This difference in potential was relatively small and was determined by means of a suitable measuring instrument. The early investigators in the field or piezo-electricity or pressure-electricity experimented with different kinds of crystals in order to determine in what substances this effect was most pronounced. Their experiments led them to the conclusion that this effect of generating electricity by a difference in mechanical pressure was most marked in a crystal of the substance commonly known as Rochelle salts or sodium-potassium-tartrate.

It has been discovered that Piezo-electrical crystals, and especially those of the above-named salts, are admirably adapted for use as telephone transmitters and receivers, repeaters, loud speakers, modulators of radio frequency currents, and the like. It has also been discovered that piezo electrical crystals may be used with particular advantage in submarine signaling between friendly boats or for the detection of hostile submarines. It has also been discovered that these crystals when placed on the ground or on some object in contact with the ground, such as a rock, tree, or the like, are extremely sensitive to an earth tremor caused, for instance, by a person walking in proximity thereto. This latter use of these crystals is of particular advantage in trench warfare. The above and other uses for piezo electrical crystals and the process of making the same in a large form are described and claimed in the following copending applications Serial No. 226,343, April 2, 1918, A. M. Nicolson, "Method of making piezo electrical crystals", issued as Patent 1,414,370, May 2, 1922; Serial No. 227,802, April 10, 1918, A. M. Nicolson "Piezophony," issued as Patent 1,495,429, May 27, 1924.

The present invention relates to piezoelectrical crystals when used as translators of energy in the form of mechanical or electrical vibrations which may impinge thereon and has to do with such a use of crystals similar to those made by the process set forth in the above entitled application.

One object of this invention is to increase the sensitiveness of piezo-electrical crystals and is achieved by the application of mechanical pressure thereto while in use.

Another object is the production of a phonographic device which is capable of reversibly transforming pressure variations efficiently into electrical variations.

These objects are further and more effectively achieved first, by providing the crystal with pole-faces which are slightly concave and, secondly, by providing means whereby mechanical vibrations which the crystal produces or to which it is subject, are produced in the form of vibrations torsional with respect to one of its axes.

The invention is illustrated in the drawing, of which Fig. 1 represents a cross-section of a piezo electrical crystal which may be employed; Fig. 2 represents a perspective view of the crystal; Fig. 3 represents one use of the crystal namely, as a phonographic transmitter employing springs as a pressure-applying device; Fig. 4 represents a modified form of such a transmitter employing rubber bands for applying pressure; Fig. 5 represents a diagram of a circuit arrangement to which the transmitter is adapted; Fig. 6 represents the characteristic curve of the crystals' performance under pressure variations; Fig. 7 repressents a broken elevation of the crystal face showing the concave-curve of the pyramidal pole-faces; and Fig. 8 represents a preferred manner in which the crystal may be mounted on a phonograph arm.

As shown in Figs. 1 and 2, the crystals when formed have pyramidal poles at the ends such as 1, 1, and another pole at the intermediate portion or girdle 2. The end poles are flattened out in any suitable manner to a form slightly concave as shown in Figs. 4 and 7. When the crystal is to be used as a phonograph transmitter, the crystal is mounted as shown in Fig. 3. Around the middle portion of the crystal 4 is wrapped a strip of tin foil 5 over which the wires or conductors 6 are wound and led out through an insulated bushing 7 to form a terminal 8. Around and outside the wires 6 is wound one turn of rubber tape 9 to insulate these wires. With the exception of the pyramidal pole-face the crystal is then painted with Ambroid or other varnish which renders it moisture-proof and also further electrically insulates one pole from the other. After the crystal is coated with varnish a plurality of layers of rubber tape 10 is wound around the greater part of the side of the crystal and around the terminal wires as shown.

In the previous preparation of the pyramidal pole-faces 1, 1 the center portion of each face is slightly shallowed out with respect to the edges and corners of the pole-face (see Fig. 7) so that when the crystal is mounted as shown in Fig. 3, the greatest pressure brought to bear on the crystal will be effective on the corners which have been found to be more sensitive to vibration than any other parts. The crystal is then mounted as shown in Fig. 3 between two plates 11, 12 preferably of aluminum. The lower plate 12 has eyes 13, to which are connected springs 14, which at their other ends are connected to eyes 15 threaded through apertures in the upper plate 11. Thumb nuts 16 permit the springs 14 to be tightened to exert a pressure on the crystal between the plate. When used as a phonographic transmitter a plate 17 is placed between the lower pole and plate 12 to which plate 17 is fastened the phonographic needle 18. In positioning the crystal between the plates it is found that the most effective response to needle vibration is produced when one of the corners 2' (see Fig. 2) is placed as near as possible to needle 18.

Since the pyramidal poles are connected to the plates 11 and 12 which are metallically connected together, it is only necessary to complete the electrical circuit by connecting one wire to one of the eyes 15 and the other wire to the terminal 8.

It is also found that when the needle is placed in the groove of a phonograph record the best response of the crystal to the record groove variations occurs when the needle, the plate to which it is attached, and the pyramidal pole-faces 1 are in planes substantially vertical thereby producing torsional vibrations in the crystal when the groove in which the needle is moving is cut with vertical variations. For any other form of record groove of course the position of the crystal with respect to the groove should be suitably altered to produce this sort of vibration.

Referring to Fig. 6 the curve shown represents the pressure-current characteristic of the crystal. The pressures are plotted as abscissæ and the currents are plotted as ordinates. Accordingly it will be noted that the portion $ab$ is the steepest portion and that for a pressure change $x$ the current variation $y$ is the greatest at this point. Therefore, it will be readily comprehended that if the crystal is placed under a permanent pressure amounting to a value $z$ on the curve, that any small increase or decrease in pressure exteriorly produced will give the maximum current variation for a small pressure change. In this manner the sensitiveness of the crystal is increased exceedingly and adapts it for the reproduction of musical combinations of sound or the reproduction of any other combination of pressure variations with all the perfection of the original.

In Fig. 4 is shown a modified form of transmitter in which plates 11 and 12 and the springs 14 are eliminated. In this form the crystal is prepared in the usual manner as to the girdle pole and the wires 19 which are wrapped around the tinfoil 20. These wires connect with terminal 21, having a strip of rubber tape 22 wrapped around them. The poles are covered by aluminum plates 24 and 25 to the lower one of which the needle 18 is attached. Wires 26 are wrapped around the crystal from one pyramidal pole to the other, thus electrically connecting the same. Between the wires 26 and the crystal on each side is placed a strip of insulating tape 26' which separates wires 26 from the tinfoil 20. These wires connect with terminal 27. The whole structure, including the terminal wires, is then covered with rubber tape or bands 27' which are applied under pressure, and is wrapped around from one pyramidal pole to the other to insulate the structure and to produce a desired pressure between these poles. In the case of these crystals a pressure of the order of fifty pounds has been found satisfactory.

In Fig. 5 is shown a circuit arrangement for the reproduction of sound from a phonograph record. The record is numbered 28 and the transmitter 29 is mounted in any suitable manner so that the needle 18 rides in the record in the manner above described. The transmitter is connected to an audion amplifier set 30 of any well-known type, although this amplifier set may be omitted without any departure from the spirit of the invention. The output of this amplifier set is connected to a switch 31 adapted to connect in circuit, either a head receiver set 32 or another crystal 33 which may be used as a receiver. The action of this receiver is most effectively brought into play by placing the receiver on a hard surface such as a table top which would respond readily to vibrations produced in the crystal by the current variations.

The record 28 may be a blank plastic record and may be suitably impressed by vibrations of the needle caused by the action of the crystal in response to electrical currents sent over the line from any suitable source. Thus, it is seen that the single crystal acts equally well as a recorder or reproducer without a modification of its structure.

The action above described is seen to be reversible, since, as shown in Fig. 6, pressure variations applied by the crystal 29 produce current variations in the circuit, which current variations when applied to crystal 33 produce pressure variations therein and from them sound waves.

Fig. 8 represents a preferred form for mounting the above described crystal on a phonograph arm. It comprises a sheet of fibre board or other suitable substance 34 to which is connected a plug 35 by means of sealing wax 36 or other cementitious material. This plug may be inserted in the aperture of a phonograph arm 41. The fibre board is bent to conform to the shape of the crystal and is held thereagainst by elastic bands 37 which encircle it and the springs 14. A plurality of other elastic bands 38 are placed around the transmitter as shown and extend from plate 11 to plate 12. A sheet of rubber tape 39 completely surrounded by a sheet of tinfoil or the like 40 is placed between the needle plate 17 and the plate 12. The rubber bands 37 and 38 dampen the local vibrations of the springs 14 and the plates 11 and 12 and the rubber sheet 39 also prevents local vibrations of the plate 12 from affecting the needle 18.

What is claimed is:

1. A phonographic transmitter comprising a piezo-electrical substance, said substance being capable of generating voltage in response to a change in mechanical pressure on the substance.

2. A phonographic transmitter comprising a piezo-electrical crystal and means for subjecting said crystal to a predetermined constant pressure along one of its axes.

3. A phonographic transmitter comprising a piezo-electrical crystal having two parallel pole-faces, and means for applying a predetermined pressure to said pole-faces.

4. A phonographic transmitter comprising a piezo-electrical crystal having two parallel pole-faces, a pair of conducting plate members respectively abutting said pole-faces, and means for subjecting the crystal to pressure through said plates.

5. A phonographic transmitter comprising a piezo-electrical crystal having two parallel pole-faces, a pair of conducting plate members respectively abutting said pole-faces, means for subjecting the crystal to pressure through said plates, and a phonograph needle receiving means attached to one of said plates.

6. A combined phonographic recorder and reproducer comprising a piezo-electrical crystal capable of reversibly transforming mechanical pressure variations into electrical variations.

7. A phonographic transmitter comprising a piezo-electrical crystal having two parallel pole-faces, a pair of conducting plate members respectively abutting said pole-faces, and a phonograph needle attached to one of said plates.

8. A phonographic transmitter comprising a piezo-electrical crystal having two end pyramidal poles and an intermediate encircling girdle pole, conducting plate members abutting the ends of the pyramidal pole-faces, spring means connecting said plate members for applying pressure to said pole-faces, a plurality of conducting wires encircling the girdle pole, said wires being in electrical contact with said pole, a wrapping of insulation around said wires, means on one of said plates for supporting the wrapped end of said wires, and a phonograph needle attached to one of said plate members.

9. A phonographic transmitter comprising a piezo-electrical crystal having an axis, and means for subjecting said crystal to torsional mechanical pressure variations with respect to said axis.

10. A phonographic transmitter comprising a piezo-electrical crystal having two parallel pole-faces, an axis connecting said pole-faces, and means for subjecting one of said pole-faces to torsional mechanical pressure variations with respect to said axis.

11. A phonographic transmitter comprising a piezo-electrical crystal having two pole-faces and an axis connecting said pole-faces, plate members abutting said pole-faces, and means for subjecting one of said plates to torsional mechanical pressure variations with respect to said axis.

12. A phonographic transmitter comprising a piezo-electrical crystal having two parallel pole-faces and an axis connecting said pole-faces, plate members abutting said pole-faces, and means between and connecting said plate members to subject the pole-faces to pressure, and means comprising a phonograph needle attached to one of said plates to subject said crystal to torsional mechanical pressure variations with respect to said axis.

13. A phonographic transmitter comprising a piezo-electrical crystal having a concave pole-face, a plate contacting therewith, and means for applying pressure to said plate.

14. A phonographic transmitter comprising a piezo-electrical crystal having two parallel concave pole-faces, plate members abutting said pole-faces, and means for applying pressure to said plate members to subject said crystal to a predetermined pressure.

15. A phonographic transmitter comprising a piezo-electrical crystal having two concave pole-faces substantially parallel to each other, flat plate members abutting said pole-faces, spring means between said plate members for subjecting them to pressure, and a phonograph needle attached to one of said plate members.

16. A phonograph transmitter comprising a piezo-electrical crystal having a phonograph needle attached thereto, said crystal being provided with terminals adapted to be connected to a transmission line.

17. A phonographic transmitter comprising a piezo-electrical crystal having two parallel pole-faces, means for attaching a phonograph needle to one of said pole-faces, said needle and said pole-face being in substantially parallel planes.

18. A translator of energy comprising a piezo-electrical crystalline body, and means for subjecting said body to a predetermined constant pressure along one of its axes, in addition to the atmospheric pressure and simultaneously subjecting said body to a variable pressure.

19. A translator of energy comprising a piezo-electrical crystalline body having two parallel pole-faces, means for applying a predetermined pressure to said pole-faces, and means for simultaneously subjecting said body to a variable pressure, said predetermined pressure being of approximately such an amount as to condition said body for producing a maximum change of generated electro-motive force for a given small change of pressure on said body.

20. A translator of energy comprising a piezo-electrical crystal having two parallel pole-faces, a pair of conducting plate members respectively abutting said pole-faces, and means for subjecting the crystal to a constant pressure through said plates and simultaneously subjecting said crystal to a variable pressure.

21. A translator of energy comprising a piezo-electrical crystal having two end pyramidal poles and an intermediate encircling girdle pole, conductor plate members abutting the ends of the pyramidal pole-faces, spring means connecting said plate members for applying pressure to said pole-faces, a plurality of conducting wires encircling the girdle pole, said wires being in electrical contact with said pole, a wrapping of insulation around said wires, and means on one of said plates for supporting the wrapped end of said wires.

22. A device for producing one wave corresponding to another wave, one of said waves being a sound wave and the other being a voltage wave, said device comprising a piezo-electrical crystal having an axis, and said device comprising means for subjecting said crystal to mechanical pressure torsional with respect to said axis and varying in accordance with the wave of said sound.

23. A device for producing a voltage wave corresponding to a sound wave, said device comprising a piezo-electrical crystal having two parallel pole-faces and an axis connecting said pole-faces, and said device comprising means for subjecting one of said pole-faces to mechanical pressure torsional with respect to said axis and varying in accordance with the wave of said sound.

24. A device for producing a voltage wave corresponding to a sound wave, said device comprising a piezo-electrical crystal having two pole-faces and an axis connecting said pole-faces, and said device comprising plate members abutting said pole faces, and means for subjecting one of said plates to mechanical pressure torsional with respect to said axis and varying in accordance with the wave of said sound.

25. A translator of energy comprising a piezo-electrical crystal having a concave end pole-face.

26. A translator of energy comprising a piezo-electrical crystal having two parallel concave pole-faces, plate members abutting said pole-faces, and means for applying pressure to said plate members to subject said crystal to a predetermined pressure.

27. A phonographic transmitter for producing a voltage wave corresponding to a sound wave, said transmitter comprising a piezo-electrical crystal and means, including a phonographic needle receiving means, for subjecting said crystal to pressure varying in accordance with said sound wave.

28. A phonographic transmitter for generating a voltage varying in accordance with a sound wave, said transmitter comprising a piezo-electrical crystal, means for subjecting the crystal to a predetermined constant pressure along one of its axes, and means, including a stylus receiving means, for subjecting the crystal to a pressure varying in accordance with said sound wave.

29. A phonographic transmitter comprising a piezo-electrical crystal and means including a stylus holder adapted to transmit mechanical pressure between said crystal and a stylus.

30. The method of increasing the responsiveness of a piezo-electrical crystalline body used to produce a varying pressure of one kind from a varying pressure of another kind, which comprises subjecting said body to a constant pressure while one of said kinds of variable pressure is being applied to said body, said constant pressure being of approximately such an amount as to condition said body for producing a maximum change of pressure of said one kind for a given small change of applied pressure of said other kind.

31. The method of generating a voltage varying in accordance with the wave motion of a stylus in a phonograph record groove, which comprises impressing on a piezo-electrical crystal a pressure varying in accordance with the motion of the stylus.

32. The method of generating a voltage varying in accordance with a wave motion of a stylus in a phonograph record groove which comprises impressing on a piezo-electrical crystal a constant pressure along an axis of said crystal and a pressure varying in accordance with the motion of the stylus.

33. In a method of reproducing sound corresponding to the groove in the phonograph record, the step which comprises applying to the ends of one axis of a piezo-electrical crystal pressure varying in accordance with the variations of the record groove.

34. The combination with a phonographic transmitter comprising a piezo-electrical crystal, for transforming one kind of energy into another, one of said kinds of energy being electrical and the other being mechanical, of a space current device having a control member, and a connection between said transmitter and said device.

35. The method of operating a piezo-electric crystalline body which comprises applying energy waves corresponding to sound waves to said body in such a manner as to produce therein elastic vibrations principally torsional with respect to an axis of said crystalline body and translating said torsional vibrations into energy waves different in character from said applied waves but corresponding in form to said sound waves.

36. An energy translating device comprising a body formed from a piezo-electric crystal, said device comprising means for applying to said body mechanical force impulses corresponding to sound waves and torsional with respect to an axis of said crystalline body, and means for taking off from said body electromotive force waves corresponding in form to said sound waves.

37. A piezo-electric device, comprising an active crystal of Rochelle salt, electrical contacts upon said crystal, a support for said crystal, said support consisting of a metallic frame and a socket-device adapted to fit upon a talking machine in replacement of the customary soundbox, means for subjecting said crystal to pressure, means for exerting torsion upon said crystal around the axis of said pressure, and means for operating said torsional means by the record of the talking machine.

38. An energy translator comprising a piezo-electric crystalline body, and means for subjecting said body to a predetermined constant pressure along one of its axis in addition to the pressure of the surrounding medium and simultaneously subjecting said body to a twisting moment about said axis.

39. The method of operating a piezo-electric crystalline body having a crystal axis, which comprises subjecting said body to a predetermined constant pressure in the direction of said axis in addition to the pressure of the surrounding medium and simultaneously subjecting said body to a twisting moment about said axis.

40. A device for producing one wave corresponding to another wave, one of said waves being a sound wave and the other being a voltage wave, said device comprising a piezo-electric crystalline body having a crystal axis and means for subjecting said body to a predetermined constant axial pressure in addition to that of the surrounding medium and simultaneously subjecting said body to a twisting moment about said axis.

In witness whereof, I hereunto subscribe my name this 7th day of May A. D., 1919.

ALEXANDER McL. NICOLSON.